Nov. 10, 1931.    D. H. DAVIS    1,831,441
AUXILIARY LOAD SUPPORT FOR VEHICLES
Filed April 14, 1928
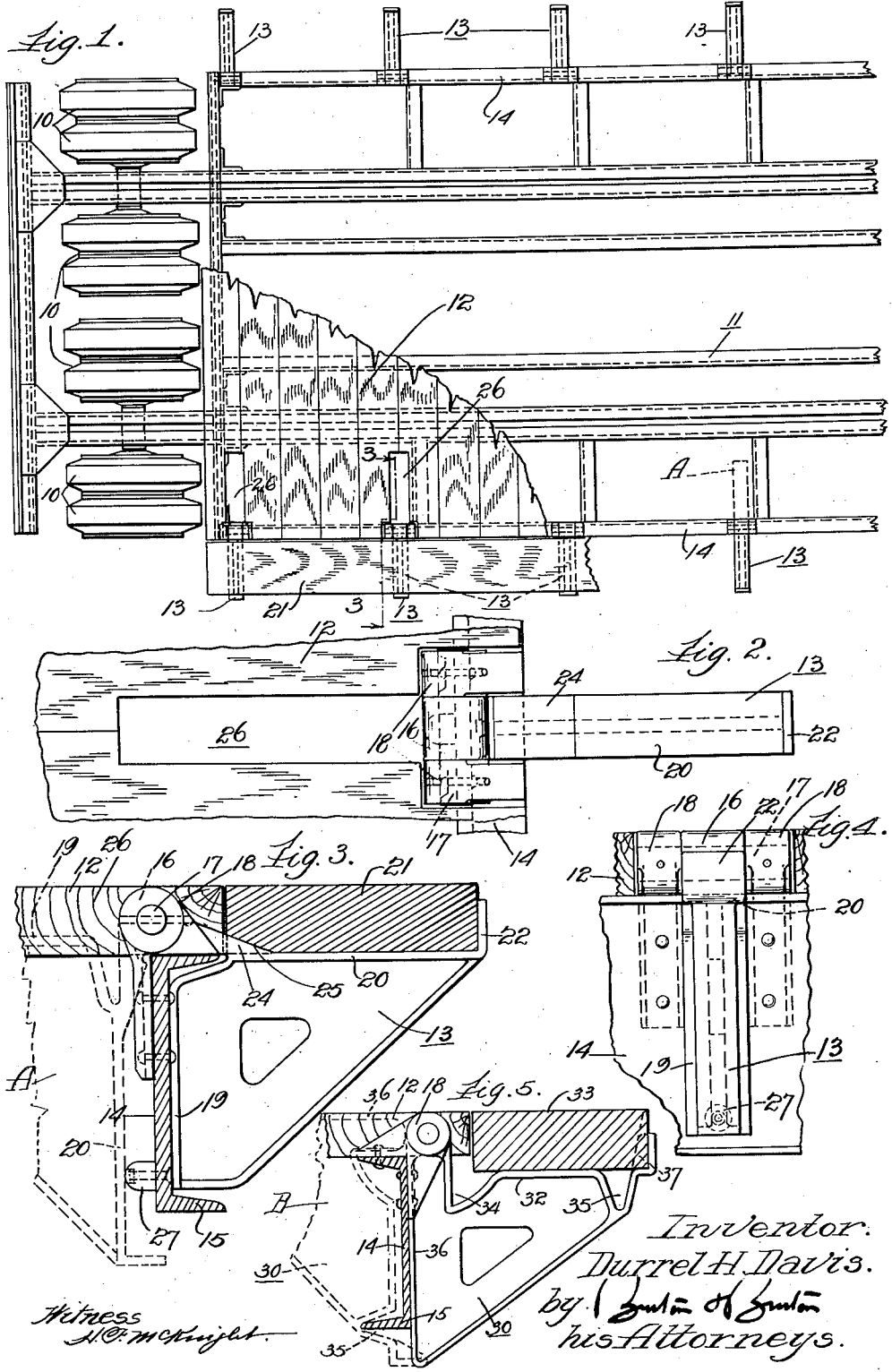
Inventor.
Durrel H. Davis.
by his Attorneys.

Patented Nov. 10, 1931

1,831,441

UNITED STATES PATENT OFFICE

DURREL H. DAVIS, OF EDGERTON, WISCONSIN, ASSIGNOR TO HIGHWAY TRAILER COMPANY, OF EDGERTON, WISCONSIN, A CORPORATION OF WISCONSIN

AUXILIARY LOAD SUPPORT FOR VEHICLES

Application filed April 14, 1928. Serial No. 270,058.

This invention relates to the load-supporting platforms of vehicles, and has for an object to provide auxiliary load-supporting means adapted for increasing or decreasing at will the effective load-supporting area of such vehicle platforms. Another object is to provide auxiliary load-supporting means adapted to be extended beyond the normal platform width into operative position, and adapted to be folded within said platform width when in inoperative position. A further object is to provide auxiliary load-supporting means that is simple, effective and durable, which may be economically adapted to vehicle construction. It consists in certain features and elements of construction herein shown and described as indicated by the claims.

In the drawings:—

Figure 1 is a partial plan view of a vehicle embodying the present invention.

Figure 2 is an enlarged fragmentary plan view of a portion of the vehicle showing the auxiliary load-supporting arm extended in operative position with removable plank omitted.

Figure 3 is a transverse, partial sectional view, taken as indicated at the line 3—3 on Figure 1; the dotted lines indicating the arm in inoperative position.

Figure 4 is an enlarged view looking at the end of the auxiliary supporting arm in extended position, with removable plank omitted.

Figure 5 is a view similar to Figure 3, showing a modified construction.

In certain localities there are laws or physical conditions limiting the over-all width of vehicles using the highways; however, conditions frequently necessitate the use of vehicles of over-all widths exceeding that normally permitted, and particularly where the limitation is physical rather than legal, as, for example, the restricted width of bridges, tunnels, or ferry boats, it is desirable that the vehicles be so constructed that increased width may be temporarily provided.

For the purpose of illustration I have shown my invention as applied to a trailer vehicle of the heavy-duty type, with supporting wheels, 10, carrying a structural frame, 11, on which is mounted flooring, 12, herein shown as of planks extending the entire width of the frame, forming the platform or normal effective load-supporting area of the vehicle. A plurality of cast, auxiliary load-supporting arms, 13, are spaced at suitable intervals and hingedly connected to the side members, 14, of the main frame herein shown as structural channels with the flanges, 15, extending outwardly. Each of said arms is formed with a boss, 16, journaled on a horizontal pin, 17, between a pair of hinge straps, 18, in which said pin is fixed. Said hinge straps are fixed to said channel, and designed so that the axis of pivoting is above the top of said channel, 14, and approximately flush with the back thereof for a purpose which will hereinafter appear. The auxiliary supporting arms are designed so that the flange 19, abuts against the inner side of the web of the channel (when disposed in operative position) so that the load-supporting flange, 20, will be sustained in substantially horizontal position to support a longitudinally extending removable plank or flooring member, 21. The supporting flange, 20, is designed so that the removable plank is carried with its upper surface substantially flush with the surface of the flooring, 12, so as to insure approximately equal distribution of the load per unit of area. An upright lug, 22, is formed at the outer end of the arm for preventing lateral displacement of the removable plank and to position it adjacent the ends of the planks constituting the flooring, 12. As shown in Figure 3, the boss, 16, is integrally connected to the supporting flange, 20, by an inclined web portion, 24, which extends through the cross sectional plane of said plank, 21, the plank being notched out at 25 for interlocking engagement with this web, 24, which thus restrains the plank against longitudinal shifting movement.

The location of the hinge or pivot axis is such as to permit folding said arms, 13, into inoperative position after removal of the plank, 21, by swinging each of the arms upwardly and toward the vehicle, passing over the side frame members and downwardly through clearance openings, 26, provided in the flooring, 12, to a position indicated in dotted lines at "A" in Figures 1 and 3, with the supporting flange, 19, now lying horizontally below the upper surface of said flooring.

The design of the arms is such that the flange, 20, would normally be arrested by partially contacting against the back of the channel, 14, if permitted, but preferably, I provide a cushion stop, 27, such as of rubber, adapted to arrest and absorb the impact of the arm when swung into inoperative position, and to maintain the same sufficiently out of the plumb as to practically obviate any swinging thereof about its hinges, due to swaying or vibration of the vehicle, thus preventing noise which would result from the arms striking against the channel frame members while obviating the need of any additional locking means.

Figure 5 shows a modified construction wherein the side member or channel, 14, is disposed with its flanges extending toward the inside of the frame and with the axis of the hinges, 18, positioned so that an auxiliary supporting arm, 30, may be swung up over and against the inside of said channel side member as shown at "B" in dotted lines in the drawings.

The auxiliary arm is designed with a flange, 32, the surface of which (when the arm is extended in operative position) lies below the top of said channel side member for supporting a removable flooring member, 33, of greater thickness than the flooring, 12. This supporting flange is formed with a recess, 34, for clearing the upper flange of said channel side member when the arm is swung into inoperative position; and a recess or pocket, 35, is provided adjacent the outer end of the supporting flange for telescoping over the lower flange, 15, of said channel with the bottom of the pocket impinging against the end of said flange for supporting the abutting flange, 36, of said arm flush with the top of the flooring, 12, and substantially filling the opening, 26. The supporting flange of the arm is formed with a rib, 37, adapted to engage in a groove or kerf formed in the flooring member, 33, to prevent end-wise shifting thereof.

I claim:—

1. In a vehicle, the combination of a main frame, flooring on said frame, and an auxiliary supporting arm hingedly mounted on said frame and adapted to be swung to extend laterally therefrom with its load-supporting surface disposed substantially horizontal and with a stop portion abutting against said frame for sustaining said arm in such load-supporting position, the flooring having an opening therein to permit the arm to be swung over said frame, through the opening and closely adjacent the inside of the frame in inoperative position with the stop portion of said arm disposed substantially flush with said flooring and substantially occupying the area of said opening in the flooring.

2. In a vehicle, the combination of a main frame including a side member having inwardly projecting flanges at top and bottom thereof, a plurality of longitudinally spaced auxiliary load-supporting arms hingedly connected to said side member at horizontal axes and adapted to extend laterally into load-supporting position, a removable flooring member adapted to be carried by said arms when so extended, the supporting surface of each arm being recessed to clear said projecting flanges when the arms are swung about their axes over and inside of said side member.

3. In a vehicle, the combination of a main frame including a side member having inwardly projecting flanges at top and bottom thereof, a plurality of longitudinally spaced auxiliary load-supporting arms hingedly connected to said side member at horizontal axes, and adapted to extend laterally into load-supporting position, a removable flooring member adapted to be carried by said arms when so extended, the supporting surface of each arm being recessed to clear said projecting flanges when the arms are swung about their axes over and inside of said side member; the bottom of one of said recesses serving as a stop against the edge of the cooperating flange of the side member to position said arm out of plumb relative to its hinge axis.

4. In a vehicle, a main frame having a side member, flooring on said frame, and an auxiliary supporting arm hingedly connected to the side member at a horizontal axis, and adapted to be extended laterally therefrom with its load-supporting surface disposed substantially horizontal, said arm having a portion remote from the hinged connection abutting against the side member for supporting the arm in such position, said hinged connection being located to permit the arm to be swung upwardly and over the side frame member and downwardly through an opening in the flooring, traveling through an arc of approximately 270 degrees so as to dispose the arm below said flooring with the load-supporting surface thereof in substantially vertical position closely adjacent to and on the inside of said side member, out of operative position.

5. In a vehicle, a main frame having a side member, flooring on said frame, and an auxiliary supporting arm hingedly connected to the side member at a horizontal axis, and adapted to be extended laterally therefrom with its load-supporting surface disposed substantially horizontal, said arm having a portion remote from the hinged connection abutting against the side member for supporting the arm in such position, said flooring substantially covering the frame and having an opening therein adjacent said arm, said hinged connection being located to permit the arm to be swung upwardly and through the opening in the flooring so as to be disposed with its load-supporting surface in substantially vertical position closely adjacent to and on the inside of said side member out of operative position.

6. In a vehicle, the combination of a main frame, flooring on said frame, a plurality of longitudinally spaced auxiliary load-supporting arms hingedly connected to said frame at horizontal axes and normally disposed within the frame and below the flooring in inoperative position, said flooring being provided with an opening adjacent each arm, said arms being adapted to be swung upwardly through their openings and extended laterally of the frame with their load-supporting surfaces disposed in substantially horizontal position slightly below the surface of said flooring, and a removable flooring member adapted to be mounted on the load-supporting surface of said arms when extended in operative position for increasing the effective load-supporting area of the vehicle.

7. In a vehicle, a main frame including a longitudinally extending structural side member having a horizontally projecting flange, and an auxiliary load-supporting arm hingedly mounted on said side member at a horizontal axis, said flooring being provided with an opening adjacent the arm, said arm being adapted to be swung about said axis so as to project laterally from said side member with its load-supporting surface disposed in substantially horizontal position, and also being adapted to be swung upwardly and inwardly about said axis through the opening in the flooring, traveling through an arc of approximately 270 degrees so as to dispose said load-supporting surface thereof in substantially vertical position closely adjacent to said side member, said arm being shaped to clear the projecting flange of the side member when it is swung to one of its positions of adjustment.

8. In the construction defined in claim 5, resilient means carried on the inner side of the side member, adapted to be encountered by said arm when it is swung to inoperative position.

9. A vehicle having a main frame including a side member, flooring on said frame, a plurality of auxiliary supporting arms hingedly connected to the side member and adapted to be swung laterally thereof, and one or more longitudinally extending flooring members carried on said auxiliary arms for increasing the effective load supporting area of the vehicle, said arms each having a rib adapted to engage in a co-operatively formed notch in one of said longitudinally extending flooring members for preventing longitudinal shifting thereof.

DURREL H. DAVIS.